(12) United States Patent
Ficca et al.

(10) Patent No.: US 12,397,848 B2
(45) Date of Patent: Aug. 26, 2025

(54) STEER-BY-WIRE STEERING SYSTEM HAVING A FEEDBACK ACTUATOR OUTSIDE THE STEERING COLUMN

(71) Applicants: thyssenkrupp Presta AG, Eschen (LI); thyssenkrupp AG, Essen (DE)

(72) Inventors: Riccardo Ficca, Goefis (AT); Kristof Polmans, Tarrenz (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 661 days.

(21) Appl. No.: 17/827,404

(22) Filed: May 27, 2022

(65) Prior Publication Data

US 2022/0379951 A1 Dec. 1, 2022

(30) Foreign Application Priority Data

May 31, 2021 (EP) .................................. 21 176 887

(51) Int. Cl.
*B62D 5/00* (2006.01)
(52) U.S. Cl.
CPC .................................. *B62D 5/006* (2013.01)
(58) Field of Classification Search
CPC ......................................... B62D 5/001–5/006
See application file for complete search history.

(56) References Cited

U.S. PATENT DOCUMENTS

| | | | |
|---|---|---|---|
| 9,096,254 B2 | 8/2015 | Sekiya | |
| 11,173,944 B2 | 11/2021 | Munding et al. | |
| 11,338,841 B2 * | 5/2022 | Mistler | B62D 1/18 |
| 11,673,601 B2 * | 6/2023 | Soderlind | B62D 5/006 |
| | | | 180/402 |
| 11,999,407 B1 * | 6/2024 | Soderlind | B62D 5/006 |
| 12,024,240 B2 | 7/2024 | Bayer et al. | |
| 2003/0042067 A1 | 3/2003 | Yanaka | |
| 2003/0146038 A1 | 8/2003 | Mills et al. | |
| 2005/0193855 A1 | 9/2005 | Sadakata | |
| 2010/0064839 A1 | 3/2010 | Schnitzer et al. | |
| 2014/0360310 A1 | 12/2014 | Osonoi et al. | |
| 2018/0072341 A1 * | 3/2018 | Schulz | B62D 5/003 |
| 2020/0062293 A1 | 2/2020 | Yeom et al. | |
| 2020/0189644 A1 | 6/2020 | Mistler | |
| 2020/0346682 A1 | 11/2020 | Forte et al. | |
| 2021/0016826 A1 * | 1/2021 | Naman | B62D 5/001 |

(Continued)

FOREIGN PATENT DOCUMENTS

| | | |
|---|---|---|
| CN | 104080689 A | 10/2014 |
| CN | 111315632 A | 6/2020 |

(Continued)

*Primary Examiner* — Kevin Hurley
(74) *Attorney, Agent, or Firm* — thyssenkrupp North America, LLC

(57) ABSTRACT

A steer-by-wire steering system for a motor vehicle may include a steering column having a support unit and a steering shaft rotatably mounted in the steering column, a steering handle disposed in a rotationally fixed manner on the steering shaft, and a feedback actuator that is configured to apply a torque to the steering shaft. The feedback actuator here may be disposed outside the support unit, as a result of which installation space is available in the region of the steering column. The feedback actuator of the steer-by-wire steering system may in some cases be disposed on a bulkhead of a motor vehicle body.

17 Claims, 3 Drawing Sheets

(56) References Cited

U.S. PATENT DOCUMENTS

2021/0163061 A1* 6/2021 Schemmel .......... B60R 16/0207
2023/0033934 A1* 2/2023 Soderlind ............... G01L 5/221

FOREIGN PATENT DOCUMENTS

| | | | |
|---|---|---|---|
| CN | 111565995 A1 | 8/2020 | |
| CN | 112703145 A1 | 4/2021 | |
| DE | 2237166 A1 | 2/1973 | |
| DE | 100 51 187 A1 | 1/2002 | |
| DE | 100 46 168 A1 | 3/2002 | |
| DE | 102018101528 A1 | 7/2019 | |
| DE | 10 2019 212 749 A1 | 2/2020 | |
| DE | 10 2018 126 714 A1 | 4/2020 | |
| DE | 102018129264 A1 | 5/2020 | |
| DE | 10 2018 132 172 A1 | 6/2020 | |
| DE | 102020124741 A1 * | 3/2022 | |
| DE | 102021208151 A1 * | 2/2023 | |
| EP | 0967133 A2 | 12/1999 | |
| EP | 2 086 815 B1 | 8/2009 | |
| EP | 2 796 343 A1 | 10/2014 | |
| WO | WO-2019238574 A1 * | 12/2019 | ............. B62D 5/006 |
| WO | WO-2023046267 A1 * | 3/2023 | ............. B62D 5/001 |
| WO | WO-2023153973 A1 * | 8/2023 | ............. B62D 5/005 |

* cited by examiner

STEER-BY-WIRE STEERING SYSTEM HAVING A FEEDBACK ACTUATOR OUTSIDE THE STEERING COLUMN

CROSS REFERENCE TO RELATED APPLICATIONS

This application is a U.S. Non-Provisional Application that claims priority to European Patent Application No. EP 21 176 887.4, filed May 31, 2021, the entire contents of which are incorporated herein by reference.

FIELD

The present disclosure generally relates to a steer-by-wire steering system for a motor vehicle.

BACKGROUND

Steer-by-wire steering systems in which the feedback actuator, also referred to as a manual force actuator, is integrated in the steering column or the steering wheel of the motor vehicle are known in the prior art. DE 10 2018 129 264 A1 thus discloses a steering system having a feedback actuator in which the restoring force or the restoring torque is formed by an electric actuator, the stator of the latter being coupled to the steering wheel hub of a steering wheel, and the rotor of said actuator being coupled to the steering wheel rim of a steering wheel. The steering wheel hub here is disposed directly on a steering shaft of a steering column. A further design embodiment of a steer-by-wire steering system is described in DE 10 2018 101 528 A1, for example. This steering system comprises an adjustable steering column having a support unit and having a steering shaft rotatably mounted in the support unit. A feedback actuator of this steering system comprises an electric motor, the latter being able to drive the steering shaft by way of a drive component which for transmitting a torque is connected to the driving shaft.

In known steer-by-wire steering systems, it is disadvantageous that not inconsiderable installation space in the motor vehicle in the region of the steering column and thus close to the human/vehicle interface is required for the steering column and for the feedback actuator in order for the different functions to be provided, in particular for providing different functionalities in terms of generating the restoring torque on the steering shaft. This space is thus only available to a limited extent for other vehicle components.

Thus a need exists for an improved steer-by-wire steering system and a motor vehicle having such a steer-by-wire steering system, in which installation space in the region of the steering column, and thus advantageously installation space close to the human/vehicle interface, is advantageously freed up.

DETAILED DESCRIPTION

Figure 1:
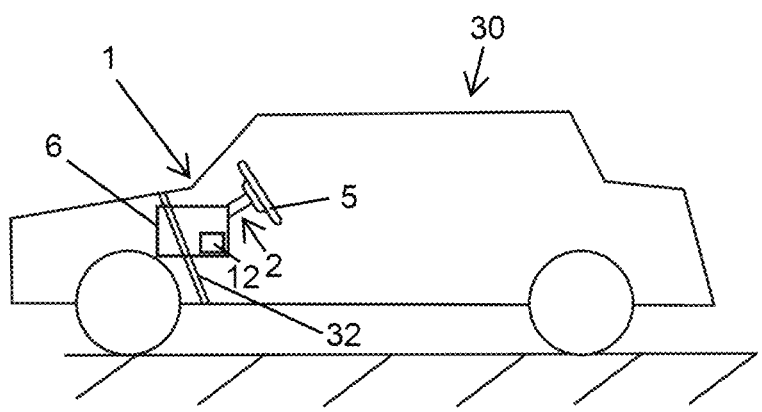
FIG. 1 is a simplified side view of an exemplary embodiment of a motor vehicle configured according to the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a steer-by-wire steering system for a motor vehicle, said steer-by-wire steering system comprising a steering column having a support unit and a steering shaft rotatably mounted in the steering column, a steering handle disposed in a rotationally fixed manner on the steering shaft, and a feedback actuator, wherein the feedback actuator is configured to apply a torque to the steering shaft. The present disclosure furthermore relates to a motor vehicle having a steer-by-wire steering system.

In some examples, a steer-by-wire steering system may include a steering column having a support unit and having a steering shaft rotatably mounted in the steering column. Furthermore, the steer-by-wire steering system has a steering handle disposed in a rotationally fixed manner on the steering shaft, and a feedback actuator, wherein the feedback actuator is configured to apply a torque to the steering shaft. The feedback actuator here is disposed outside the support unit. In particular, the feedback actuator is disposed outside the steering column. Outside the support unit, or outside the steering column, respectively, here means in particular that the feedback actuator is not disposed on the support unit, or is not disposed on the steering column, respectively. In particular, the feedback actuator is also not disposed on the same support element fixed on the body as the support unit. Furthermore particularly, the feedback actuator does not protrude, in particular also not partially, into the support unit, or into the steering column, respectively. In particular, the feedback actuator is physically spaced apart from the support unit, or from the steering column, respectively. It is provided in particular that the feedback actuator does not act, in particular also not indirectly, for example by way of a gear mechanism, on the steering shaft in the region of the support unit and in particular not within the support unit, or does not act on the steering shaft in the region of the steering column and in particular not within the steering column. As a result of the feedback actuator being disposed outside the support unit, or outside the steering column, respectively, installation space in the region of the steering column, and thus advantageously installation space close to the human/vehicle interface in a motor vehicle, is advantageously freed up. Moreover, the installation of the steering system in a motor vehicle is advantageously more flexible as a result, and can be more simply adapted to different vehicles and vehicle types, in particular to different passenger motor vehicles. Furthermore advantageously, the function of "supporting the steering handle", as in a classic steering column, and the function of "applying the restoring torque", as in the proposed steer-by-wire steering system, are mutually decoupled in terms of construction.

The steering column of the steer-by-wire steering system is advantageously configured to implement individually or in combination all customary functions, in particular adjustability for length and/or adjustability for height and/or absorption of energy in the event of a crash. It is provided in particular that the steering column comprises an actuation unit and an adjustment installation, wherein the actuation unit by means of the adjustment installation can be adjusted relative to the support unit, in particular in terms of height and/or in terms of length. The adjustment installation for the height adjustment advantageously comprises an electric motor. Furthermore advantageously, the adjustment installation for the length adjustment comprises an electric motor. In particular, the actuation unit of the steering column is configured so as to be telescopic, wherein at least one internal casing tube is advantageously displaceable in an external casing tube. It is furthermore particularly provided that the steering column has means, in particular at least one fastening part on the support unit, so as to dissipate energy in the event of a crash. Alternatively or additionally, it can be provided that the actuation unit in the event of a crash is configured to dissipate energy by sliding in relation to the support unit.

The feedback actuator of the steer-by-wire steering system serves in particular for introducing a torque into the steering shaft, the latter also being referred to as a steering spindle, wherein the torque is in particular dependent on mechanical loads acting on the steered vehicle wheels of a motor vehicle. These mechanical loads include, for example, frictional forces between the vehicle wheels and the road surface, wherein these frictional forces are particularly dependent on the pavement and on the ground characteristics, and impacts which may be caused by road bumps or potholes, for example. To this extent, the feedback actuator simulates in particular forces which, in the case of the steering handle being mechanically coupled to the steered vehicle wheels, would act on the steering handle.

According to one advantageous design embodiment of the proposed steer-by-wire steering system it is provided that the feedback actuator in spatial terms is disposed in front of the support unit. The spatial allocation here relates to a steering system installed in a motor vehicle, wherein the references "front" and "rear", "right" and "left" that are customary in a motor vehicle apply. Accordingly, the steering handle is disposed behind the support unit. It is provided in particular that the feedback actuator is not disposed to the right and not to the left beside the support unit, and advantageously is also not disposed above and not below the support unit. The feedback actuator disposed in front of the support unit can however in particular be disposed so as to be laterally or vertically offset from the support unit. The disposal of the feedback actuator so as to be spatially in front of the support unit advantageously repositions installation space toward the front in the motor vehicle and thus frees up installation space in the region of the steering column. New design possibilities for motor vehicle manufacturers are advantageously achieved as a result.

According to a further advantageous design embodiment the steering shaft by way of a front end opposite the steering handle is routed out of the support unit such that a front steering shaft portion extending from the front end is disposed outside the support unit, in particular is disposed in front of the support unit. The feedback actuator here is advantageously disposed in such a manner that the latter applies the torque to the steering shaft in the front steering shaft portion. The application of the torque to this steering shaft portion here can take place directly or indirectly. A gear mechanism which transmits the torque from the motor of the feedback actuator to the steering shaft portion is provided in particular for an indirect application. In this design embodiment, the steering shaft is advantageously lengthened in comparison to the steering shaft of a conventional steer-by-wire steering system. The feedback actuator here advantageously engages directly on the front end of the steering shaft. As a result, the distance between the support unit and the feedback actuator is advantageously further enlarged.

One advantageous variant of design embodiment provides a further steering shaft, wherein the further steering shaft is connected to the steering shaft. The feedback actuator here is advantageously disposed in such a manner that the latter applies the torque to the further steering shaft, in particularly applies it directly to the further steering shaft. The feedback actuator thus advantageously transmits the torque to the further steering shaft, wherein the torque is transmitted from the further steering shaft by way of the connection to the steering shaft, and from the steering shaft to the steering handle. As a result of the further steering shaft, the flexibility of the disposal of the feedback actuator is advantageously further increased, in particular because the longitudinal axis of the steering shaft and the longitudinal axis of the further steering shaft can enclose an angle of less than 180°, thus can in particular be disposed so as not to be parallel. When the further steering shaft is angled in relation to the steering shaft, advantages in the crash behaviour of the steering system are moreover derived as a result. It can in particular also be provided that more than one further steering shaft is connected to the steering shaft, wherein the feedback actuator transmits the torque to the steering shaft and the steering handle by way of a plurality of further steering shafts. It is provided in particular that the feedback actuator is disposed on the further steering shaft in such a manner that the further steering shaft and the motor shaft of the feedback actuator are disposed in the same axis of longitudinal extent.

The further steering shaft is advantageously connected to the steering shaft by way of a coupling. As a result, a rotation and thus a torque can be particularly advantageously transmitted between the further steering shaft and the steering shaft. One variant of design embodiment here provides that the coupling is an elastic coupling. In this way, torque peaks can advantageously be damped by the elastic coupling. According to one further variant of design embodiment, the coupling is a stiff coupling. The torques applied to the further steering shaft by the feedback actuator here are advantageously transmitted more directly to the steering shaft.

One further advantageous design embodiment provides that the further steering shaft is connected to the steering shaft by way of a universal joint. The universal joint here permits advantageously that the bending angle between the further steering shaft and the steering shaft varies during the transmission of torque. To this extent, this design embodiment furthermore facilitates a flexible disposal of the feedback actuator outside the support unit.

It is furthermore advantageously provided that the feedback actuator is assigned a control unit, wherein the control unit for transmitting signals is connected to the feedback actuator by way of a communications channel, in particular a communications bus, furthermore particularly a CAN bus (CAN: controller area network). The control unit here controls the feedback actuator, in particular an electric motor of the feedback actuator. The control unit comprises in particular a closed control loop for generating the control signal for the feedback actuator, wherein a rotation angle detected on a shaft of a steering actuator and/or a torque detected on a shaft of a steering actuator are/is in particular provided for generating the control signal. It is provided in particular that the feedback actuator comprises the control unit. The transmission of signals between the control unit and the feedback actuator by way of the communications channel can take place in a wireless manner or by wire. It is provided in particular that the communications channel is configured in such a manner that the control unit can be disposed so as to be remote from the feedback actuator. The flexibility in terms of disposing the feedback actuator is advantageously further increased as a result.

According to one further advantageous embodiment of the invention the feedback actuator has means for disposing the feedback actuator on a bulkhead of a motor vehicle. The bulkhead of a motor vehicle is advantageously configured so as to be sufficiently stiff so that the feedback actuator is sufficiently supported in order for the torques to be applied. It is provided in particular that the feedback actuator has fastening tabs having screw openings as means for disposing the feedback actuator on a bulkhead of a motor vehicle. According to one advantageous design embodiment here, the fastening tabs are inclined in relation to the feedback actuator, in particular in such a manner that the feedback actuator can be optimally aligned for applying the torque to the steering shaft, or the further steering shaft, respectively. In particular, lateral brackets or a lateral ring surrounding the feedback actuator can also be provided as means for disposing the feedback actuator on a bulkhead of a motor vehicle. Holes, in particular screw holes, are advantageously in said lateral brackets or said lateral ring, so that screws or rivets or other fastening means can be routed through the holes in order for the feedback actuator to be attached to a bulkhead of a motor vehicle. As a result of the feedback actuator being disposed on a bulkhead of a motor vehicle, the feedback actuator is advantageously moved comparatively far away from the steering column and the support unit so that installation space about the steering column advantageously remains available, said installation space potentially being utilized for other vehicle components and further increasing the flexibility of the design.

Alternatively, or in combination with the disposal of the feedback actuator on the bulkhead, another element such as, for example, the floor pan assembly, of the motor vehicle can also be used.

Furthermore advantageously, elements of the feedback actuator are configured as at least one first module and as at least one second module. This configuration of the elements as first modules and second modules advantageously enables a modular construction of the feedback actuator. As a result, further degrees of freedom in terms of the disposal of the feedback actuator are advantageously achieved. Moreover, the feedback actuator as a result is able to be even better adapted to different vehicles and different vehicle types. A control unit and/or a motor and/or a gear mechanism and/or a steering angle delimiter are/is in particular provided as elements of the feedback actuator. According to one variant of design embodiment, each of the abovementioned elements can be configured here as a separate module.

One further advantageous embodiment provides that the at least one first module is configured for disposal on a first side of a bulkhead of a motor vehicle, and the at least one second module is configured for disposal on a second side of a bulkhead of a motor vehicle. It can be provided in particular that only one module is in each case disposed on one side of a bulkhead. The first modules and the second modules for disposal on a bulkhead have in particular the means for disposing the feedback actuator on a bulkhead of a motor vehicle. As a result of the feedback actuator thus potentially being partially disposed on a first side of a bulkhead of a motor vehicle and potentially being partially disposed on a second side of this bulkhead of a motor vehicle, the design possibilities for disposing the feedback actuator advantageously become even more flexible. This leads to an even greater freedom of design for the motor vehicle manufacturers. It is provided in particular that the means for disposing the feedback actuator on a bulkhead of a motor vehicle of the first module, or of the first modules, respectively, and of the second module, or of the second modules, respectively, are mutually adapted such that said modules can be connected so as to fix one another, wherein a bulkhead in this instance is disposed between the modules.

The motor vehicle likewise proposed for achieving the object mentioned at the outset comprises a body having a bulkhead and a steer-by-wire steering system which is configured according to the invention and may in particular have the above-described features individually or in combination. The steering column of the steer-by-wire steering system by way of the support unit is disposed on the body of the motor vehicle here, and the feedback actuator of the steer-by-wire steering system is disposed on the bulkhead of the motor vehicle. The feedback actuator is thus in particular disposed outside the support unit. In the case of this motor vehicle, more installation space is advantageously available in the region about the steering column and in the region about the support unit of the steering column, said installation space being able to be used otherwise, in particular for further assistance systems.

One advantageous design embodiment provides that the feedback actuator is disposed on the bulkhead within a passenger compartment formed by the body. The feedback actuator here is advantageously protected in relation to influences of the external vehicle environment, for example in relation to dirt and in relation to splash water.

According to one variant of design embodiment however, the feedback actuator is disposed on the bulkhead outside of a passenger compartment formed by the body. The feedback actuator here is in particular disposed in the engine bay. As a result, installation space in the passenger compartment is advantageously available. Because the space requirement in the engine bay is usually less in the case of electric vehicles in particular than in the case of vehicles with an internal combustion engine, the engine bay is moreover sometimes specifically better utilized when the motor vehicle is an electric vehicle. Moreover, in the case of a defect it may be easier to access the feedback actuator by way of the engine bay.

In one further design embodiment in which elements of the feedback actuator are configured as at least one first module and as at least one second module, wherein the at least one first module and the at least one second module enable a modular construction of the feedback actuator, it is advantageously provided that the at least one first module is disposed on the bulkhead outside the passenger compartment, and the at least one second module is disposed on the bulkhead within the passenger compartment. The flexibility in terms of disposing the feedback actuator is advantageously even further increased as a result.

An exemplary embodiment of a motor vehicle 30 is illustrated in a highly simplified manner in FIG. 1, said motor vehicle 30 comprising a body having a bulkhead 32 and a steer-by-wire steering system 1. The steer-by-wire steering system 1 has a steering column 2 which is only schematically illustrated in FIG. 1 and has a support unit and a steering shaft rotatably mounted in the support unit. A steering handle 5, in particular a steering wheel, is disposed in a rotationally fixed manner on the steering shaft. The steer-by-wire steering system 1 furthermore comprises a feedback actuator 6 which is likewise only schematically illustrated in FIG. 1 and is configured to apply a torque to the steering shaft and thus to the steering handle 5. The feedback actuator 6 is disposed outside the steering column 2. The bulkhead 32 of the motor vehicle 30 is used for fastening those elements of the feedback actuator 6 that have to support torques. The control unit 12 of the feedback actuator 6 can however be disposed at another location. An embodiment in which the control unit 12 is likewise disposed on the bulkhead 32 is however also provided in particular.

Figure 2:
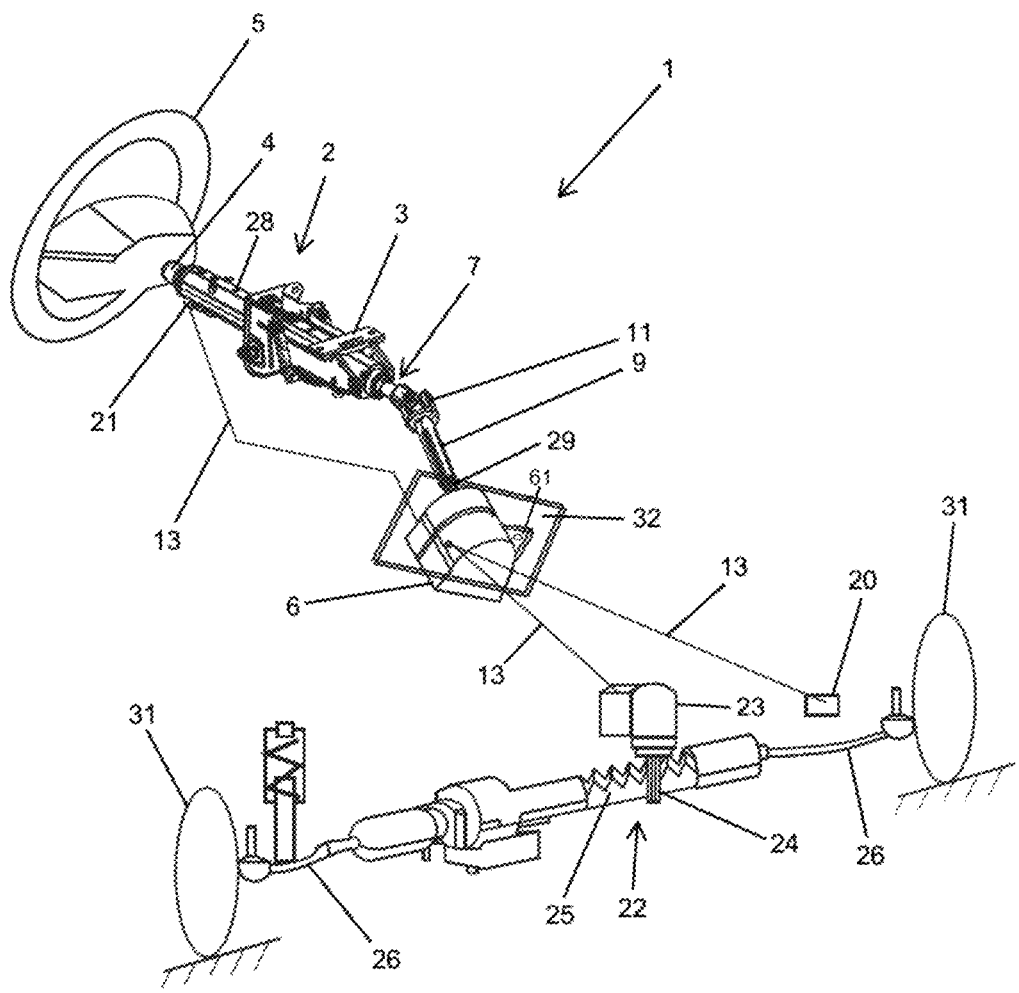
FIG. 2 is a simplified perspective view of an exemplary embodiment of a steer-by-wire steering system configured according to the present disclosure.

An exemplary embodiment of a steer-by-wire steering system 1 which is configured according to the invention and in which more design embodiment details are shown will be explained hereunder with reference to FIG. 2. FIG. 2 shows here the steer-by-wire steering system 1 in a perspective schematic illustration when viewed obliquely from the front in terms of the positional indication usually used for a motor vehicle.

The steer-by-wire steering system 1 suitable for a motor vehicle, in particular for a passenger motor vehicle, comprises a steering column 2 having a support unit 3. The steering column 2 by means of the support unit 3 is able to be fastened to a motor vehicle so as to be fixed on the body. The steering column 2 in this exemplary embodiment moreover comprises an adjustment installation and an actuation unit having a casing unit 28. A steering shaft 4 is rotatably mounted in the casing unit 28. A steering wheel as the steering handle 5 is disposed on the rear end of the steering shaft 4. The actuation unit and thus the steering handle 5 by means of the adjustment installation can be adjusted in terms of height and length relative to the support unit 3, wherein the height adjustment is performed by pivoting the actuation unit relative to the support unit 3. The length adjustment is in particular performed by sliding the casing unit 28 in and out in the manner of a telescope. The adjustment of the actuation unit relative to the support unit 3 can in particular also take place electrically.

The support unit 3 for fastening to a vehicle body has fastening tabs which are provided with screw openings. The support unit 3 by means of fastening screws can be attached to a vehicle body by way of these screw openings. The support unit 3 can also have a fastening part which in the event of a crash is configured to dissipate energy in a steering system installed in a motor vehicle. In this instance, the fastening tabs are in particular disposed on this fastening part.

The steer-by-wire steering system 1 furthermore comprises a feedback actuator 6 which is disposed outside the steering column 2. The feedback actuator 6 has an electric motor, in particular a permanent-magnet synchronous motor. The electric motor of the feedback actuator 6 here acts on the front end of a further steering shaft 9 of the steer-by-wire steering system 1. The further steering shaft 9 in this exemplary embodiment for the adjustability of the steering handle 5 has a telescopic portion 29, the extent of the latter, proceeding from the feedback actuator 6, being able to be variably adjusted.

Because the further steering shaft 9 is connected to the steering shaft 4 by way of a universal joint 11, the feedback actuator 6, when correspondingly actuated by a control unit, by way of the further steering shaft 9 and the universal joint 11 applies a torque to the steering shaft 4 and thus also to the steering handle 5. The control unit in this exemplary embodiment is disposed directly on the electric motor. In order for the electric motor of the feedback actuator 6 to be actuated, the control unit of the feedback actuator 6 by way of a communications channel 13 receives from a sensor 21 a signal pertaining to a rotation angle of the steering shaft 4. Furthermore, the control unit of the feedback actuator 6 by way of a communications channel 13 receives from a sensor 20 a signal pertaining to a steering angle of the steered wheels 31 of the motor vehicle.

The control unit of the feedback actuator 6 by way of a communications channel 13 for exchanging signals is connected to a steering control unit of a steering actuator 23 of the steer-by-wire steering system 1, said steering control unit controlling an electric motor of the steering actuator 23. The steering actuator 23 here is configured to act on the steered wheels 6 of the motor vehicle as a function of a detected steering input which a driver by way of the steering handle 5 applies to the steering shaft 4. To this end, the steer-by-wire steering system 1 comprises a steering gear 22. A steering pinion 24, which is able to be driven by the electric motor of the steering actuator 23, herein acts on a rack 25. The steering gear 22 here serves for converting a rotating movement of the steering pinion 24 into a translatory movement of the rack 25 along the longitudinal axis of the rack 25. The rack 25, which moves in a linear manner along the longitudinal axis thereof, on both sides of a motor vehicle is in each case mechanically coupled to a steering link 26. The steering links 26 in turn are in each case mechanically coupled to the steered wheels 31 of a motor vehicle.

As is only symbolically indicated in FIG. 2, it is provided that the feedback actuator 6 is disposed on the bulkhead 32 of a motor vehicle. The bulkhead 32, of which only a fragment is symbolically illustrated in FIG. 2, here serves to close off the passenger compartment below that region in which the windscreen is inserted. It is provided in particular that the feedback actuator 6, like the support unit 3, has fastening tabs 61 having screw openings as means for disposing the feedback actuator 6 on the bulkhead 32.

As a result of the feedback actuator 6 being disposed so as to be spatially distanced in front of the support unit 3 on the bulkhead 32, the installation space required for the steer-by-wire steering system 1 about the steering column 2 is reduced. In particular, no installation space behind or beside or above or below the support unit 3 is required for installing the feedback actuator, in particular because the feedback actuator 6 is advantageously not disposed on the support unit 3 or on the steering column 2.

Further various embodiments for a steer-by-wire steering system 1 which is installed in a motor vehicle and has a steering column 2 will be explained with reference to FIGS. 3 to 7. The steering column 2 can be configured in particular as described in EP 2 086 815 B1. EP 2 086 815 B1 is thus fully incorporated by reference.

A body floor pan 37 of the body of the motor vehicle here is in each case schematically illustrated in FIGS. 3 to 7. Furthermore schematically illustrated are in each case an accelerator pedal 36, which can in particular be a gas pedal or a current pedal, and a bulkhead 32 of the motor vehicle.

A steering column 2, having a bearing 27, of the steer-by-wire steering system 1 is in each case illustrated in FIGS. 3 to 7. A steering shaft 4 is rotatably mounted in the bearing 27. A steering handle 5 is disposed in a rotationally fixed manner on the rear end of the steering shaft 4. Furthermore illustrated in FIGS. 3 to 7 is in each case the feedback actuator 6 of the steer-by-wire steering system 1, said feedback actuator 6 being configured to apply a torque to the steering shaft 4. The feedback actuator 6 in the exemplary embodiments illustrated in FIGS. 3 to 7 has in each case one electric motor 17, one control unit 12 for actuating the electric motor 17, a gear mechanism 18 and a steering angle delimiter 19 which prevents a steering angle beyond a specified limit to be adjusted by way of the steering handle 5. The feedback actuator 6 here is in each case disposed outside the steering column 2, specifically on the bulkhead 32 so as to be physically spaced apart in front of the steering column 2. To this end, the feedback actuator 6 has in each case means for disposing the feedback actuator 6 on the bulkhead 32.

In the exemplary embodiments illustrated in FIGS. 3 to 6 the steer-by-wire steering system 1, in addition to the steering shaft 4, has a further steering shaft 9 which is connected to the steering shaft 4. The feedback actuator 6 here is specified in such a manner that the latter acts directly on the further steering shaft 9 and, when correspondingly actuated by means of the control unit 12, transmits a torque by way of the further steering shaft 9 to the steering shaft 4, and thus to the steering handle 5. In the exemplary embodiments according to FIGS. 3 to 5 the further steering shaft 9 here is connected to the steering shaft 4 by way of a universal joint 11. In the exemplary embodiment according to FIG. 6 the further steering shaft 9 is connected to the steering shaft 4 by way of a coupling 10, wherein the coupling 10 can be configured so as to be stiff or elastic, in particular as a function of the desired characteristic associated therewith. In particular, as opposed to the illustration of FIGS. 3 to 6, the further steering shaft 9 can be angled in relation to the steering shaft 4, in particular as is shown in an exemplary manner in FIG. 2.

Figure 7:
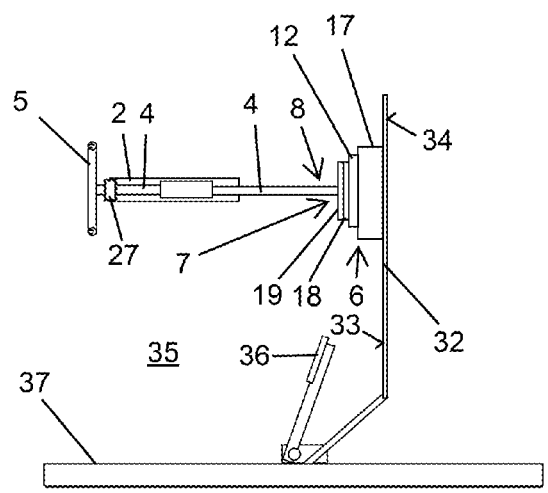
FIG. 7 is a simplified side view of a fragment from a further exemplary embodiment of a motor vehicle configured according to the present disclosure.

In contrast, no further steering shaft 9 is provided in the exemplary embodiment illustrated in FIG. 7. Instead, the steering shaft 4 by way of a front end 7, opposite the steering handle 5, is routed out of the steering column 2 such that a front steering shaft portion 8 extending from the front end 7 is disposed outside the steering column 2. The feedback actuator 6 in this exemplary embodiment is disposed in such a manner that said feedback actuator 6 applies the torque to the steering shaft 4 in the front steering shaft portion 8, and thus outside the steering column 2.

Moreover, the exemplary embodiments shown in FIGS. 3 to 7 differ in terms of the disposal of the feedback actuator 6 on the bulkhead 6.

Figure 3:
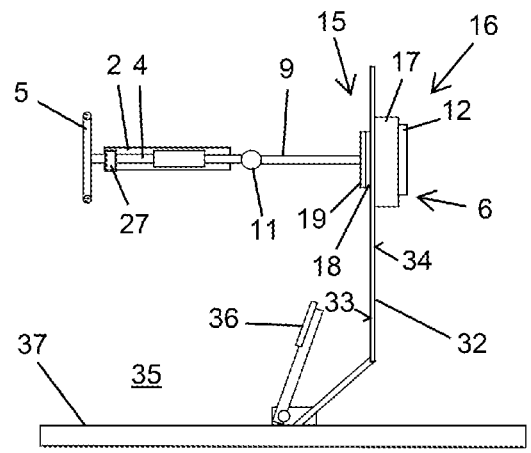
FIG. 3 is a simplified side view of a fragment from a further exemplary embodiment of a motor vehicle configured according to the present disclosure.

In the exemplary embodiment illustrated in FIG. 3, the gear mechanism 18 and the steering angle delimiter 19 of the feedback actuator 6 form first modules 15, and the electric motor 17 and the control unit 12 of the feedback actuator 6 form second modules 16, as a result of which a modular construction of the feedback actuator 6 is enabled. The first modules 15 in this case are disposed on a first side 33 of the bulkhead 32, wherein the first side 33 faces the passenger compartment 35. The second modules 16 in this case are disposed on a second side 34 of the bulkhead 32. The assignment of the elements of the feedback actuator 6, thus in particular of the control unit 12, the motor 17, the gear mechanism 18 and the steering angle delimiter 19, as a first module 15 or a second module 16 here can however also take place in a different manner. It is particularly advantageous for the control unit 12 to be disposed in the passenger compartment 35 or on that side 33 of the bulkhead 32 that faces the passenger compartment 35.

Figure 4:
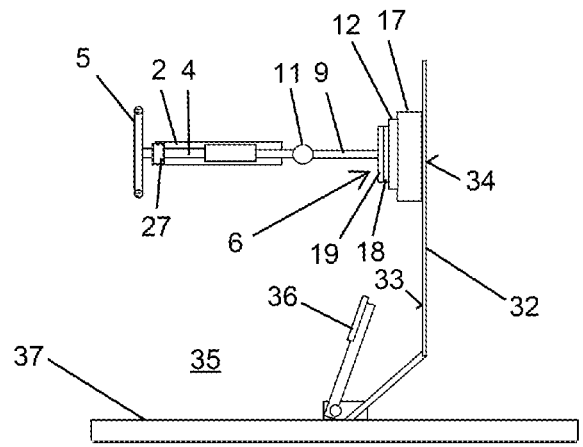
FIG. 4 is a simplified side view of a fragment from a further exemplary embodiment of a motor vehicle configured according to the present disclosure.
Figure 5:
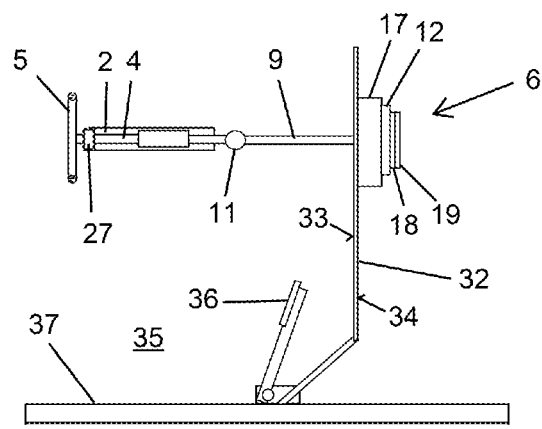
FIG. 5 is a simplified side view of a fragment from a further exemplary embodiment of a motor vehicle configured according to the present disclosure.
Figure 6:
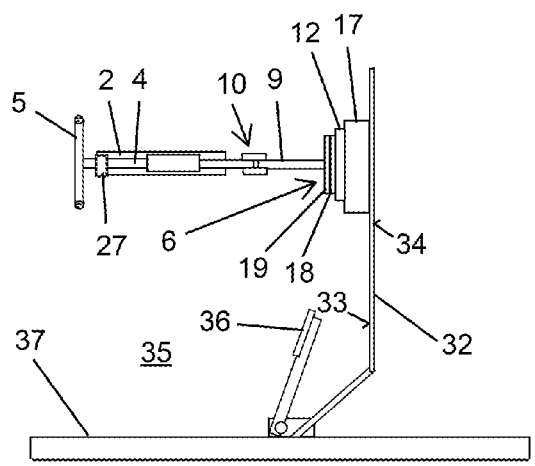
FIG. 6 is a simplified side view of a fragment from a further exemplary embodiment of a motor vehicle configured according to the present disclosure.

In the exemplary embodiments illustrated in FIG. 4, FIG. 6 and FIG. 7 the feedback actuator 6 is disposed completely on the first side 33 of the bulkhead 32, and thus in the passenger compartment 35. In contrast, the feedback actuator 6 in the exemplary embodiment illustrated in FIG. 5 is disposed completely on the second side 34 of the bulkhead 32, and thus outside the passenger compartment 35, in particular in an engine bay of the motor vehicle.

Figure 8:
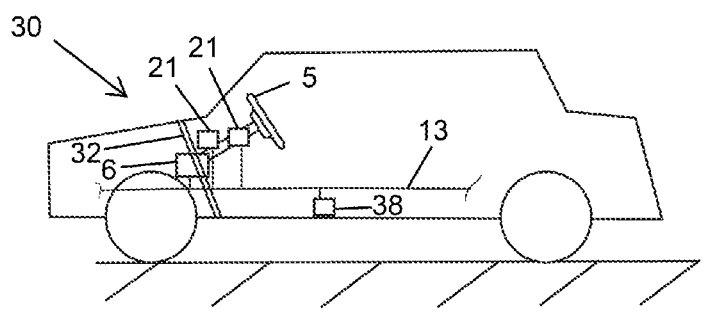
FIG. 8 is a simplified side view of a further exemplary embodiment of a motor vehicle configured according to the present disclosure.

A schematically illustrated exemplary embodiment of a motor vehicle 30 having a steer-by-wire steering system is explained with reference to FIG. 8. The motor vehicle 30 comprises a body having a bulkhead 32 on which the feedback actuator 6 of the steer-by-wire steering system is disposed. The feedback actuator 6 is assigned a control unit for actuating the electric motor of the feedback actuator, wherein the control unit for transmitting signals is connected to the feedback actuator 6, or the electric motor of the feedback actuator 6, respectively, by way of a communications channel 13 which in this exemplary embodiment is configured as a CAN bus. Moreover, for exchanging signals the control unit of the feedback actuator 6 by way of the communications channel 13 configured as a CAN bus is connected to sensors 21 of the steering system and to a central ECU 38 (ECU: Electronic Control Unit) of the motor vehicle 30.

The exemplary embodiments illustrated in the figures and explained in conjunction with the latter serve for the purpose of explaining the invention and do not limit the latter.

LIST OF REFERENCE SIGNS

1 Steer-by-wire steering system
2 Steering column
3 Support unit
4 Steering shaft
5 Steering handle
6 Feedback actuator
7 Front end of the steering shaft (4)
8 Front steering shaft portion of the steering shaft (4)
9 Further steering shaft
10 Coupling
11 Universal joint
12 Control unit
13 Communications channel
15 First module of the feedback actuator
16 Second module of the feedback actuator
17 Motor of the feedback actuator
18 Gear mechanism of the feedback actuator
19 Steering angle delimiter of the feedback actuator 20 Sensor for determining the steering angle
21 Sensor of the steering system
22 Steering gear
23 Steering actuator
24 Steering pinion
25 Rack
26 Steering link
27 Bearing
28 Casing unit
29 Telescopic portion of the further steering shaft (9)
30 Motor vehicle
31 Steered wheel
32 Bulkhead
33 First side of the bulkhead (32)
34 Second side of the bulkhead (32)
35 Passenger compartment
36 Accelerator pedal
37 Body floor pan
38 ECU

What is claimed is:

1. A steer-by-wire steering system for a motor vehicle, comprising:
a steering column having a support unit and a steering shaft rotatably mounted in the steering column;
a steering handle disposed in a rotationally fixed manner on the steering shaft; and
a feedback actuator configured to apply a torque to the steering shaft, wherein the feedback actuator is disposed outside the support unit;
wherein the feedback actuator includes fastening tabs having screw openings for disposing the feedback actuator on a bulkhead of the motor vehicle.

2. The steer-by-wire steering system of claim 1 wherein the feedback actuator is disposed outside the steering column.

3. The steer-by-wire steering system of claim 1 wherein the feedback actuator is disposed in front of the support unit.

4. The steer-by-wire steering system of claim 1 wherein the steering shaft by way of a front end opposite the steering handle is routed out of the support unit such that a front steering shaft portion extending from the front end is disposed outside the support unit, wherein the feedback actuator is configured to apply the torque to the steering shaft in the front steering shaft portion.

5. The steer-by-wire steering system of claim 1 wherein the steering shaft is a first steering shaft, the steer-by-wire steering system comprising a second steering shaft that is connected to the first steering shaft, wherein the feedback actuator is configured to apply the torque to the second steering shaft.

6. The steer-by-wire steering system of claim 5 wherein the second steering shaft is connected to the first steering shaft by way of an elastic coupling, a stiff coupling, or a universal joint.

7. A steer-by-wire steering system for a motor vehicle, comprising:
a steering column having a support unit and a steering shaft rotatably mounted in the steering column;
a steering handle disposed in a rotationally fixed manner on the steering shaft; and
a feedback actuator configured to apply a torque to the steering shaft, wherein the feedback actuator is disposed outside the support unit;
wherein elements of the feedback actuator are configured as a first module and a second module, wherein the first and second modules enable a modular construction of the feedback actuator.

8. The steer-by-wire steering system of claim 7 wherein the feedback actuator comprises at least one of a control unit, a motor, a gear mechanism, or a steering angle delimiter.

9. The steer-by-wire steering system of claim 7 wherein the feedback actuator comprises a control unit, a motor, a gear mechanism, and a steering angle delimiter.

10. The steer-by-wire steering system of claim 7 wherein the first module is configured to be disposed on a first side of a bulkhead of the motor vehicle, wherein the second module is configured to be disposed on a second side of the bulkhead of the motor vehicle.

11. The steer-by-wire steering system of claim 7 wherein the feedback actuator is disposed outside the steering column.

12. The steer-by-wire steering system of claim 7 wherein the feedback actuator is disposed in front of the support unit.

13. The steer-by-wire steering system of claim 7 wherein the steering shaft by way of a front end opposite the steering handle is routed out of the support unit such that a front steering shaft portion extending from the front end is disposed outside the support unit, wherein the feedback actuator is configured to apply the torque to the steering shaft in the front steering shaft portion.

14. The steer-by-wire steering system of claim 7 wherein the steering shaft is a first steering shaft, the steer-by-wire steering system comprising a second steering shaft that is connected to the first steering shaft, wherein the feedback actuator is configured to apply the torque to the second steering shaft.

15. The steer-by-wire steering system of claim 14 wherein the second steering shaft is connected to the first steering shaft by way of an elastic coupling, a stiff coupling, or a universal joint.

16. A motor vehicle comprising:
a body having a bulkhead; and
a steer-by-wire steering system that includes:
a steering column having a support unit and a steering shaft rotatably mounted in the steering column,
a steering handle disposed in a rotationally fixed manner on the steering shaft, and
a feedback actuator configured to apply a torque to the steering shaft, wherein the feedback actuator is disposed outside the support unit;
wherein the steering column by way of the support unit is disposed on the body,
wherein the feedback actuator is disposed on the bulkhead;
wherein the feedback actuator is disposed on the bulkhead outside a passenger compartment formed by the body.

17. The motor vehicle of claim 16 wherein elements of the feedback actuator are configured as a first module and a second module, wherein the first and second modules enable a modular construction of the feedback actuator, wherein the first module is disposed on the bulkhead within a passenger compartment and the second module is disposed on the bulkhead outside the passenger compartment.

* * * * *